Dec. 23, 1969   L. D. KELLER   3,485,365
HYDRAULIC UPFLOW CLASSIFICATION APPARATUS
Filed Jan. 11, 1968   4 Sheets-Sheet 1

INVENTOR.
LEON D. KELLER
BY: *Theodore M. Jablon*
ATTORNEY.

Dec. 23, 1969 L. D. KELLER 3,485,365
HYDRAULIC UPFLOW CLASSIFICATION APPARATUS
Filed Jan. 11, 1968 4 Sheets-Sheet 2

INVENTOR.
LEON D KELLER
BY: Theodore M. Jablon
ATTORNEY.

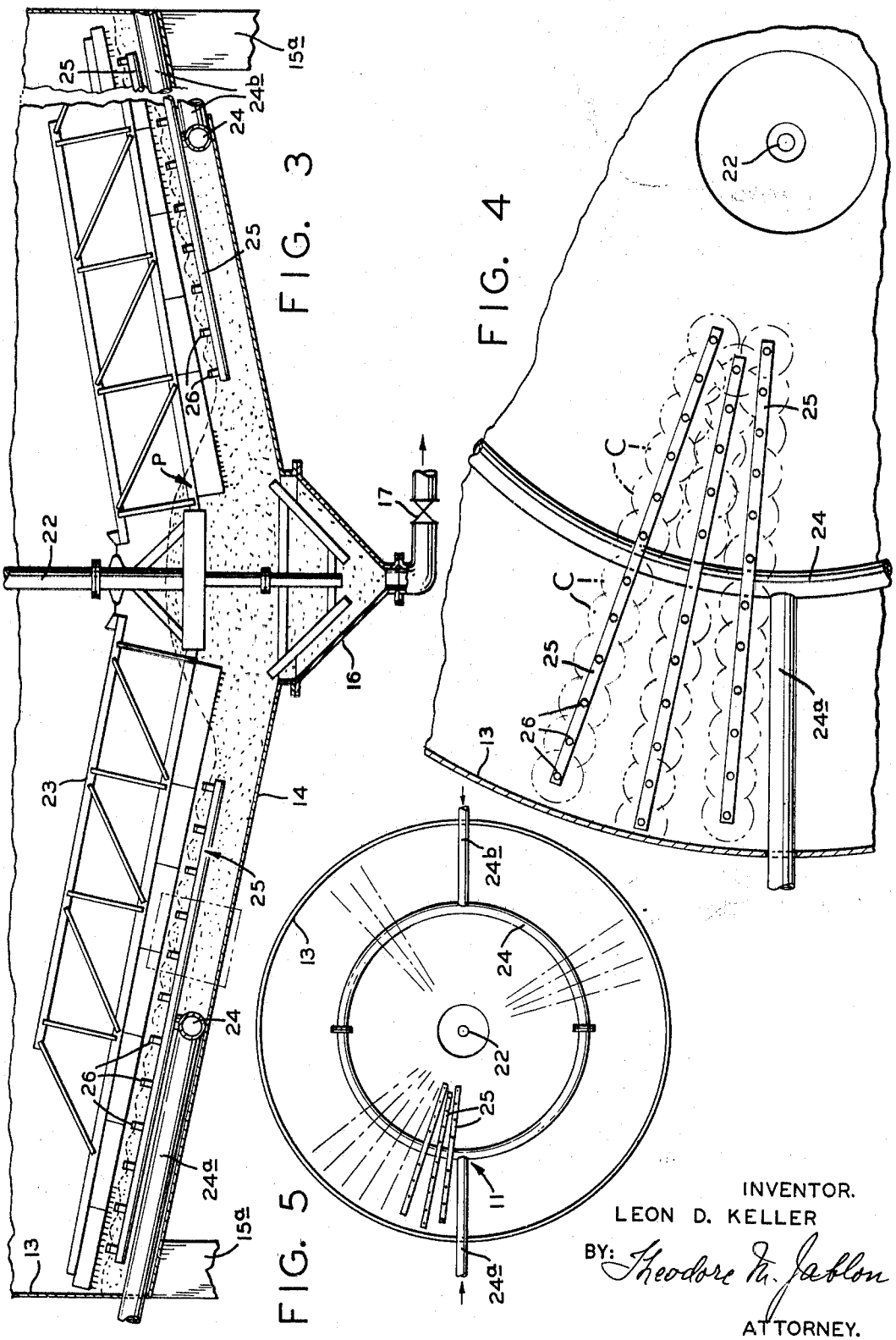

Dec. 23, 1969     L. D. KELLER     3,485,365
HYDRAULIC UPFLOW CLASSIFICATION APPARATUS
Filed Jan. 11, 1968     4 Sheets-Sheet 4

INVENTOR.
LEON D. KELLER
BY: *Theodore M. Jablon*
ATTORNEY.

United States Patent Office 3,485,365
Patented Dec. 23, 1969

3,485,365
HYDRAULIC UPFLOW CLASSIFICATION APPARATUS
Leon D. Keller, Virginia, Minn., assignor to Dorr-Oliver Incorporated, Stamford, Conn., a corporation of Delaware
Filed Jan. 11, 1968, Ser. No. 697,184
Int. Cl. B03d 1/16, 1/00
U.S. Cl. 209—422                              10 Claims

ABSTRACT OF THE DISCLOSURE

Hydraulic classification apparatus for effecting the separation of pulp solids in a teeter bed, wherein heavy overside particles at the bottom are moved mechanically across a teeter water induction or distribution system providing a bottom agitation zone, to a quiescent collection zone for withdrawal of an underflow fraction of high solids concentration, said particles being cleansed while being moved through said bottom agitation zone.

---

This invention relates to apparatus for the hydraulic hindered settling classification and/or de-sliming of metallurgical pulps or the like, for instance iron ore pulps.

Hindered settling classification in a broader sense requires that the pulp solids be kept in a state of teeter or suspension by a rising flow of hydraulic operating water, so controlled as to cause an undersize fraction of the solids in the feed mixture including finely divided material or slimes to be carried out via overflow, while allowing an oversize fraction of coarse solids to be removed from the bottom zone of the teeter bed.

It is generally recognized that sharpness of separation and the removal of fines or slimes from a pulp is attainable more completely by such upflow hydraulic classification rather than by mechanical classification which employs agitation by mechanical means, even though hydraulic upflow classification requires larger amounts of operating water and is subject to limitations in the oversize range.

The rate of hydraulic water supply and the rate of oversize withdrawal from the teeter bed are controllable relative to one another in such a manner as to maintain a desired critical separation between the oversize and the undersize, or else merely the removal of the slimes. Instrumentation for sensing changes in the density pattern of the teeter bed and for monitoring the solids concentration of the fractions is available for maintaining that control.

A closed-circuit grinding operation is an example requiring such classification control for establishing optimum grinding efficiency, as well as thorough removal of entrapped undersize and slimes from the oversize fraction that is being recirculated from the classification apparatus to the grinding mill.

In a more specific sense, such hindered settling operation is effective in the de-sliming of pulps, that is the washing out from the pulp of only the finest fraction, namely the solids in the micron range, the presence of which may interfere with subsequent treatment steps, or the slimes themselves may be of value.

In view of the conditions set forth above, it is among the problems, not only to attain sharp separations between the undersize and oversize fractions or through de-sliming, but also to conduct the separating operation with a minimum expenditure of hydraulic operating water, while delivering both the overflowing undersize fraction or slimes and the oversize fraction in a state of relatively high solids concentration.

Another problem inherent in earlier apparatus is due to the fact that the coarse solids in the overside fraction must be kept in teeter and moving towards a point of discharge from the bottom zone of teeter bed. The problem then was that particles that are only five to six mesh sizes coarser than the size of separation could not be maintained in teeter except perhaps by applying water upflow rates that would upset the condition or density pattern of the teeter bed required for the separation, while unduly diluting the fractionation product with excessive and uneconomical amounts of hydraulic operating water. This places an undesirable limitation upon the coarse particle size range admissible in the feed pulp since the particles must be kept sufficiently mobilized in order to allow them to migrate to a point of discharge as through a bottom outlet or "hutch," or through a syphon.

Earlier pulp classification apparatus fall short of meeting one or the other or more than one of the above-stated problems or requirements.

For example, mechanical classifiers employing mechanical elements such as reciprocating rakes as in the Dorr classifier, agitate the pulp while moving it through a classification pool. The agitation throws the fines into suspension causing them to overflow from the pool, while the rakes move the coarse fraction solids from submergence in the pool. Whereas this method of classification can handle a pulp containing a wide range of particle sizes, and produce size fractions as of relatively high concentration, coupled with a low requirement in operating water, its shortcoming lies in its inability to make controllable sharp separations, and in the difficulty of handling particles of critical size.

The art of classification treatment of pulps contains numerous patents representing examples of classification in an upflowing stream rising through a perforated bottom or constriction plate, which provide relatively sharper classification and more effective de-sliming, although limited in regard to the aforementioned ability to handle solids that are substantially coarser than the mesh size of separation. The early Fahrenwald Sizers are examples of such principle of operation, later improvements of which are found for instance in patents to Darby No. 2,410,637 (1946); Darby No. 2,723,754 (1955); and Nebel No. 2,857,050 (1958).

The patent to Ekstrom No. 2,960,226 employing a jet emitting distributing system extending in a horizontal plane at the bottom of the teeter bed adds the capability of handling oversize coarse particles substantially larger than could be handled by other comparable upflow classification apparatus. In this patented apparatus, the oversize particles need not be kept in teeter, but are allowed along with some entrapped fines or slimes to sink directly from the bottom zóne of the teeter bed through the jet emitting zone into a solids compacting zone, while the teeter bed itself is maintainable by a relatively low expenditure of operating water. From the compacting zone, the solids are removed, with the aid of conveying and stirring mechanism as underflow of a high solids concentration, although still likely to contain an undesirable amount of entrapped fines or slimes possibly requiring supplemental removal treatment.

Therefore, it is among the objects of this invention to provide improved apparatus for hydraulic classification in a rising stream, whereby pulps can be handled effectively containing solids ranging from micron size slimes to oversize solids substantially greater than the size of separation. In the improved apparatus desliming is to be effected thoroughly and positively to yield clean and well-scrubbed coarse particles or sands, coupled with low economical water consumption, sharply controllable separation, and high solids concentration of the undersize and oversize fractions. Subsequent dewatering of the fractions or supplemental slimes removal are thus avoided, subsequent filter operation is improved and, in the case of silica slimes removal from iron ore pulp, the quality of blast furnace operation and of the product therefrom may be greatly enhanced.

The foregoing objects are attainable in a tank equipped with a rotary rake structure similar to those used in continuous sedimentation tanks for conveying settled solids or sludge over the tank bottom to a central discharge cone or sump. For the purposes of this invention, however, the rake arms are spaced upwardly from the tank bottom to cooperate with a teeter water induction- or distribution system beneath the rakes.

Another problem encountered in the operation of pulp separating apparatus requiring the distribution of hydraulic operating water or teeter water, is due to the fact that the conventional discharge orifices or jet openings of the water induction system are subject to plugging. This will occur even though the water is strained through a relatively tightly woven filter media, due to contaminants in the water supply and because of the presence of the pulp. To minimie the plugging it is desirable to use as large an orifice as possible. This in turn presents the problem of adequately uniform water distribution due to the presence of concentrated rising flow streams. In practice, this leads to a compromise between a large number of small orifices and good distribution versus a smaller number of large orifices, with the aim to minimize the plugging. Even so, relatively frequent shut-downs and overhauls of the water induction system have been required.

The foregoing distribution problem is overcome by the provision, instead of the conventional jet openings, of check-valve type nozzles suitably spaced from one another, that will distribute the flow from a large discharge opening so as to produce the same effect as a much larger number of the conventional orifices. These nozzles should be self-cleaning, and during periods of lowered water pressure or water failure they should prevent the entry into the induction or distribution system of pulp solids, which would result in plugging.

The improved hydraulic distribution system therefore comprises non-plugging nozzles designed to emit operating water under substantial pressure against the discharge resistance of the nozzles. Thus each nozzle will be at the center of an island or the like of intense hydraulic agitation or fluidization, whereby the oversize solids remaining in the bottom zone of the teeter bed are repeatedly scrubbed free of fines and slimes as the rotating rake structure moves any oversize solids in its path from one nozzle or island of agitation to the next, and finally into a quiescent central area and to the discharge sump yielding an underflow containing the oversize particles in a state of high solids concentration. Indications of variations in the underflow concentrations may be utilized for controlling the rate of feed of the pulp into the tank.

Such a nozzle system is also capable of compensating for differences in the static head against which the nozzles must discharge the teeter water. Hence, where a conical tank bottom is required, the distributing system may hug the conical bottom surface, and need not be limited to a horizontal plane. For purposes of this invention, check valve type nozzles are provided having valve closure means constructed to provide a valve closing force, the pressure of the operating water normally being sufficient to overcome the sum of the pressures of said closing force and of the hydraulic head in the tank.

Other features and advantages will hereinafter appear.

FIGURE 3 is an enlarged detail view of the bottom portion of the apparatus, taken from FIGURE 1, illustrating the function of the apparatus equipped with teeter water induction nozzles.

FIGURE 4 is an enlarged detail fragmentary plan view of the teeter water induction systems, indicating a pattern of effective agitation areas of the nozzles.

FIGURE 5 is a diagrammatic plan view of the teeter water induction system, showing the arrangement of a supply pipe system for the teeter water.

Figure 1:
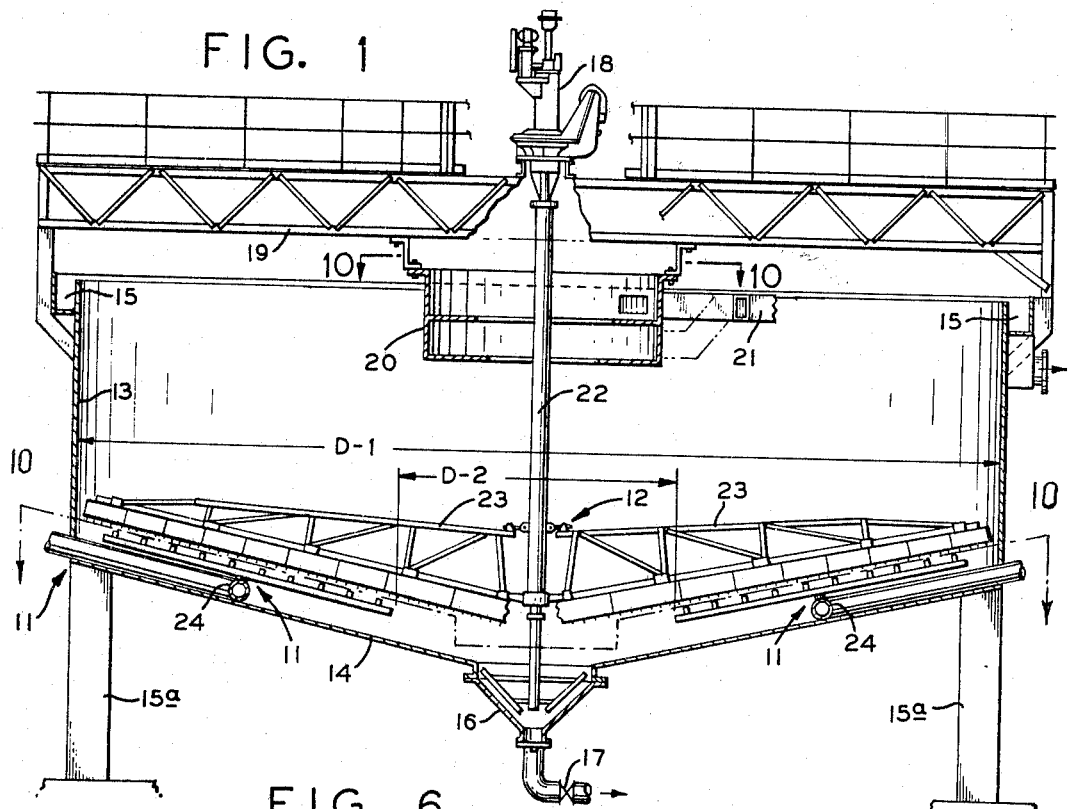
FIGURE 1 is a vertical sectional view of the improved upflow classification apparatus featuring a rotating rake structure cooperating with a subjacent teeter water induction system.

The apparatus herein exemplifying the invention, comprises basically a tank 10, an induction system 11 at the bottom of the tank for introducing teeter water into the body of pulp in the tank to maintain a teeter bed, and a rotary rake structure 12 having rake rams operating in a plane directly above and close to the induction system, in a bottom zone of the teeter bed. The water rising from the induction system effects the separation of the pulp into an undersize fraction which overflows, and an oversize or coarse fraction to be discharged as underflow through an outlet in the tank bottom. The rotating rake arms sweeping over the induction system cause even relatively large and non-teeterable particle sizes contained in the pulp mixture to be conveyed to a central collection and outlet zone capable of delivering the underflow fraction in a state of high solids concentration.

The tank may be one that has a cylindrical wall 13, a shallow conical bottom 14, and a peripheral overflow receiving launder 15. The tank itself is spaced from the ground by supporting piers or columns 15a providing access to the underside of the tank and to a sump 16 delivering the underflow fraction of the pulp through a discharge control valve 17.

Figure 10:
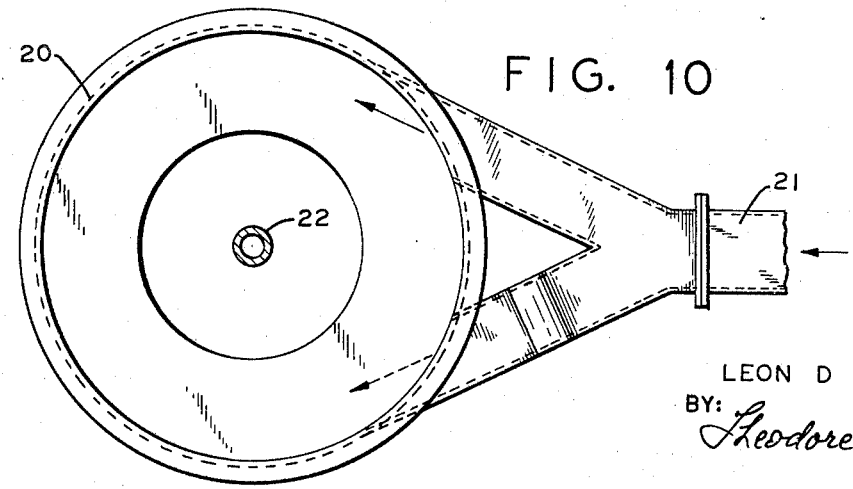
FIGURE 10 is a detail plan view of a feedwell for the tank, taken in line 10—10 in FIG. 1.

Drive mechanism 18 for rotating the rake structure as well as supporting the same, is mounted upon an overhead truss structure or bridge 19 endwise supported by the wall of the tank. The bridge also supports at its underside a feed well 20 which may be of the type shown in the U.S. patent to Fitch No. 3,006,474 and further illustrated in FIG. 10, for delivering feed pulp to the tank. A supply duct for the feed well is indicated at 21.

The rotary rake structure itself being of a known construction has a shaft 22 depending from the drive mechanism, and rake arms 23 extending from the shaft at an elevation above and close to the induction system 11, to operate in the bottom zone of the teeter bed. Preferably, the drive mechanism is of the kind that allows the rake structure to be raised or lowered.

The teeter water induction system in this embodiment may comprise an annular main header 24 shown to be resting upon the tank bottom, and having symmetrically arranged supply connections 24a and 24b. Radially extending tubes or sub-headers 25 are placed astride the main header, communicating therewith through connections 25a. The sub-headers extend at a slope substantially conforming to the conical shape of the tank bottom.

The radial sub-headers have specially suited non-plugging or non-clogging teeter water induction nozzles 26 suitably spaced from one another along the length of the sub-headers and preferably so arranged that the nozzles of each sub-header are staggered with respect to the nozzles on each adjoining sub-header. When in operation, that is when delivering teeter water, each of these nozzles may become the center of a circular area or island C of hydraulic agitation or churning (see FIG. 4). All these areas C are contained in a general upflow area defined by the outer diameter D–1 of the tank and the inner diameter D–2 which in turn defines a non-agitated central area surrounded by the upflow area. Thus, the outer ends of the radial sub-headers 25 may terminate at the wall of the tank, while the inner ends may terminate at the periphery of the central non-agitated quiescent area or oversize solids collecting zone.

Figure 7:
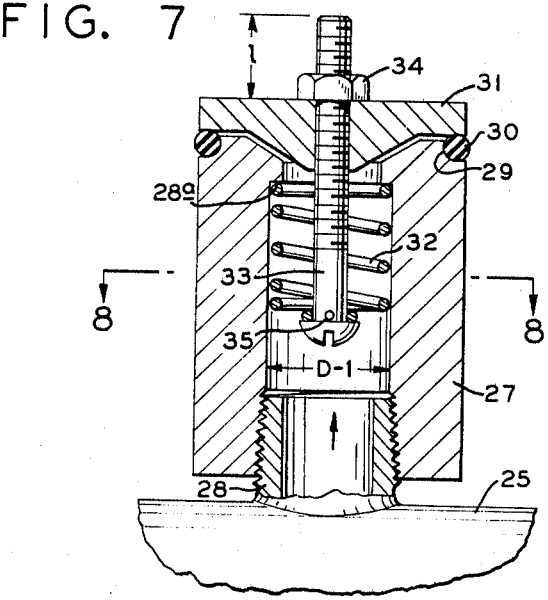
FIGURE 7 is a vertical sectional view of a valve type nozzle suited for the purposes of this invention, wherein the discharge resistance is adjustable.
Figure 8:
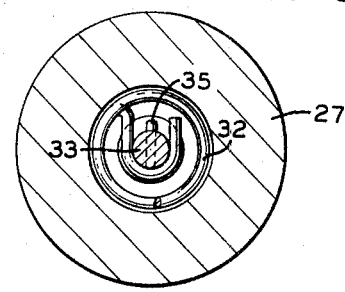
FIGURE 8 is a cross-sectional view of the nozzle taken in line 8—8 in FIGURE 7.
Figure 9:
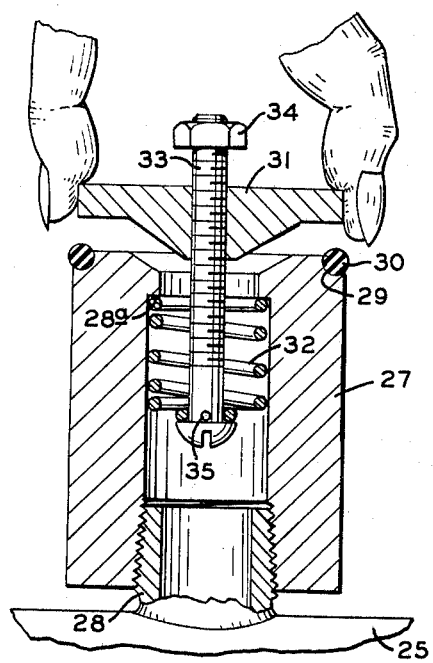
FIGURE 9 illustrates the adjustability of the nozzle of FIGURE 7.

A non-plugging nozzle suitable in the operation of this invention is of the check valve type having a valve closure member or plate spring loaded, with the spring pressure preferably adjustable for varying the discharge flow resistance of the valve relative to the pressure of the teeter water supply. A preferred form of the nozzle is shown in FIGURES 7, 8 and 9, but not claimed in this application. While the manner of its operation for instance in a desliming apparatus is well illustrated in FIGURE 6 of this application, this nozzle is the one described and claimed in application Ser. No. 699,012 filed Jan. 11, 1968 by Figliola and McCallum concurrently herewith.

Accordingly, a suitable nozzle comprises a cylindrical hollow open-ended valve body 27 of substantial wall thickness and preferably consisting of a plastic composition material. The lower end of this valve body has an internal thread tightly engaging the external thread of an upwardly directed nipple or neck 28 on the sub-header 25. The upper end of the valve body has an internal downward facing or inverted shoulder 28a concentric with the vertical axis of the nozzle. The outer peripheral top edge portion of the valve body is formed with an annular recess 29 wherein is seated an elastic O-ring 30. When stretched and snapped into this recess the resilient material of the O-ring provides a seat upon which a valve plate 31 may close down tightly. A coil spring 32 under compression exerts seating pressure upon the valve plate, the spring being confined between the inverted shoulder 28a and the lower end or head of a valve stem in the form of an inverted screw bolt 33 threaded into the valve plate 31, and secured by lock nut 34. The valve plate may consist of a plastic composition material similar to that of valve body 27.

According to FIG. 9, the seating pressure exerted by the spring is adjustable by loosening the lock nut 34, then lifting the valve plate off its seat against the spring pressure, and turning the valve plate up or down upon the thread of the stem. This will respectively decrease or increase the spring pressure, and correspondingly vary the discharge flow resistance of the nozzle relative to the pressure of the teeter water supply. Then tightening the lock nut against the valve plate will secure the adjustment. A projection or pin 35 provided in the head end portion of the stem stops rotation of the stem relative to the spring. By providing proper adjustment of the spring pressure, as well as an adequately high teeter water supply pressure, there may be established a uniform delivery rate of teeter water from all the nozzles, irrespective of the differences in static head against which the nozzles must operate, such differences being due to the sloping arrangement of the sub-headers 25. Also, with the proper spring adjustment this nozzle is non-plugging and self-cleaning, even though exposed to the solids in the pulp.

In a practical instance, with adequate water supply pressure available, all nozzles may have the pressure or compression of the springs adjusted to the same amount as indicated by the length $l$ of the upwardly protruding end portion of the stem. For example, with spring pressure of all the nozzles set at 5 lbs. and a supply pressure of about 40 lbs., substantially uniform delivery rates may be obtained from all the nozzles, thus maintaining a teeter bed of suitable characteristics, even with the sub-headers 25 inclined as shown. The nozzle will be effective even when submerged in a bed of sand, to maintain a teeter operation.

In this way, an upflow rate of teeter water may be established, sufficient to cause a desired undersize fraction to report to the overflow of the tank, yet insufficient to keep the oversize fraction solids in a state of teeter, and insufficient to prevent their accumulation in the bottom zone of the teeter bed.

Figure 6:
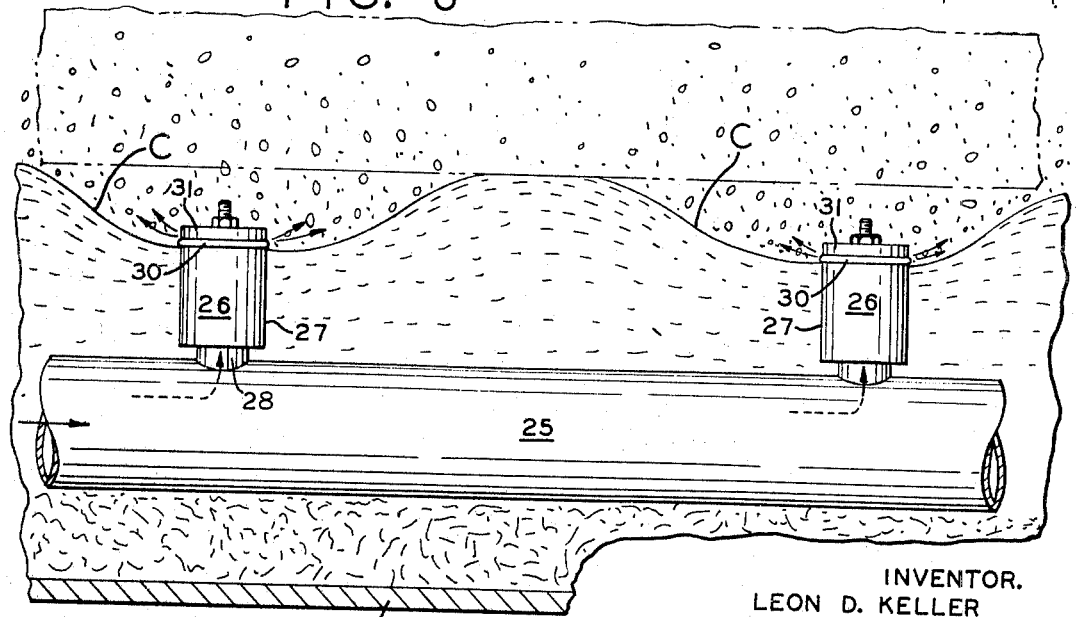
FIGURE 6 is a greatly enlarged fragmentary detail view taken from FIGURE 3, further illustrating function of the nozzles.
Figure 2:
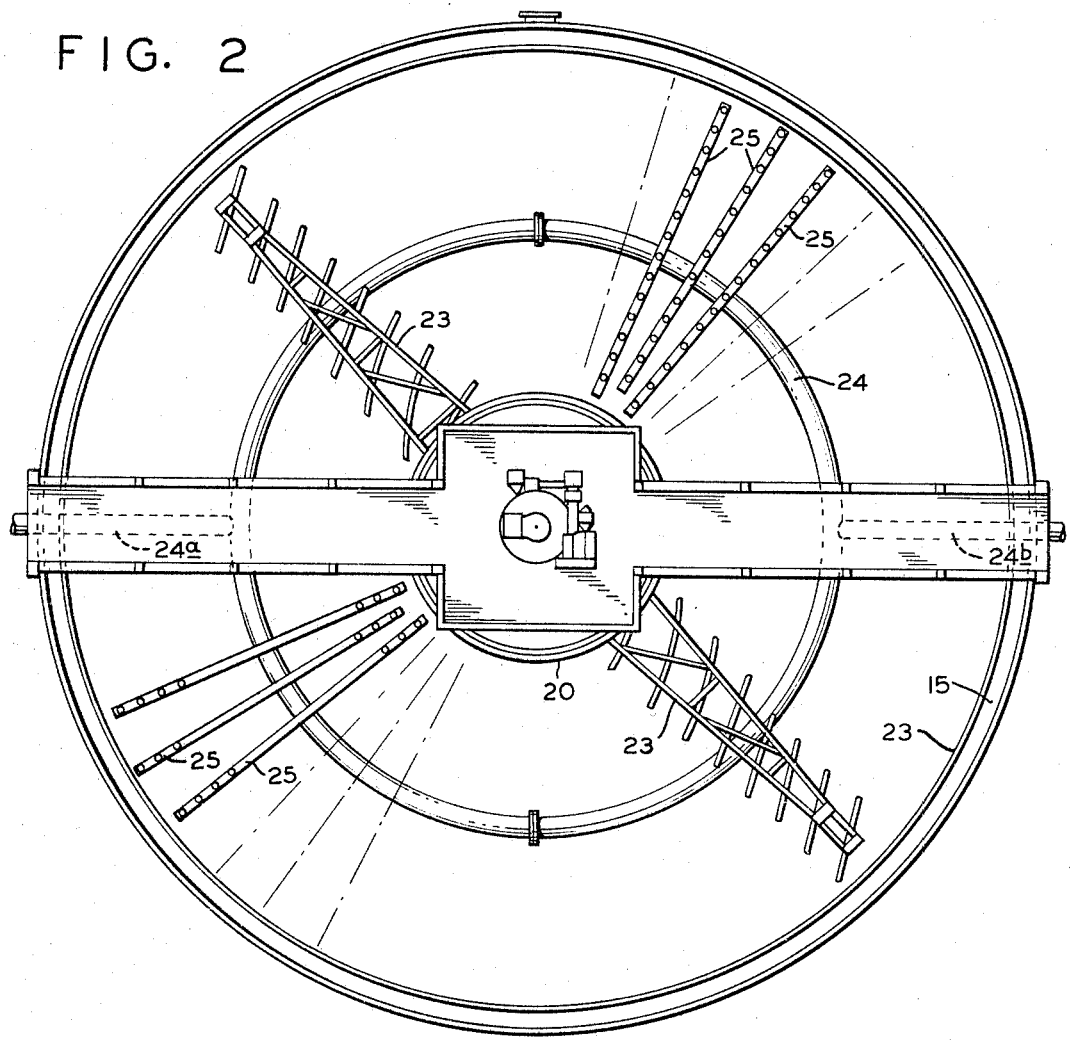
FIGURE 2 is a plan view taken on line 2—2 in FIGURE 1.

According to the invention, the rake arms of the rotating rake structure sweeping over the nozzles in the bottom zone of the teeter bed, positively moves the oversize solids from the hydraulic influence of one nozzle to the influence of the next nozzle and so on (see FIG. 6). While thus in transit towards the central outlet area, the oversize fraction solids are repeatedly agitated or churned and scrubbed free of slimes, while exposed to the direct action of the teeter liquid immediately around the nozzles, before reaching the quiescent collection area D–2 for withdrawal. A clean separation of the fractions is thus attainable, as well as a high solids concentration of the underflow. Furthermore, because of the positive mechanical conveying action of the rake structure, the consumption of teeter water is held to a practical minimum, thereby rendering the overflowing undersize fraction also in a state of relatively high solids concentration.

In one important application of de-sliming the apparatus according to this invention will effectively remove finely divided silica constituting the slimes in iron ore pulp that is to be prepared for pelletizing and subsequent smelting of the pellets or beneficiated ore in the blast furnaces. The presence of any silica in the blast furnace is objectionable, so that any improvement in the efficiency of washing out these slimes results in significantly improved blast furnace operation, with an improved iron product resulting therefrom.

From the foregoing it will be seen that the present invention combines the operational advantages of earlier classification apparatus, while eliminating their limitations. That is to say, the improved apparatus provides sharp separation or highly effective de-sliming, as well as underflow and overflow of relatively high solids concentration, with none of the earlier range limits required for the coarse particles in the oversize fraction, while teeter water consumption is held at an economical minimum. Also eliminated is the limitation or necessity of having the teeter water induction system extend in a horizontal plane. Moreover, the use of non-plugging check valve type nozzles minimizes the need for shutdown and overhaul, as compared with earlier orifice type teeter water distribution systems, while improving the economy of water consumption.

It will furthermore be understood that each of the elements, or two or more together, may also find useful application in other types of pulp classification apparatus.

While the invention has been illustrated and described as embodied in a pulp classification or de-sliming apparatus for effecting the separation in a teeter bed, it is not intended to be limited to the details shown since various modifications and structural changes may be made without departing from the spirit of the present invention. For example, the feed well arrangement, the overflow, the rake structure, the shape of the tank and tank bottom, as well as the construction of the teeter water induction system all may differ from the example and embodiment herein shown.

I claim:

1. Hydraulic classification apparatus for separating pulp solids into undersize and oversize fractions in a teeter bed, which comprises a tank having overflow means, a bottom outlet means, and means for feeding pulp to said tank, a teeter water induction system supplied with water under pressure, located at the tank bottom, providing an upflow area, said induction system comprising a multitude of nozzles adjacent to one another located in said upflow area in a bottom zone of agitation maintained by the emission of teeter water from said nozzles, and effective for maintaining a teeter bed in the tank, said nozzles being of the check valve type having valve closure means constructed to provide a valve closing force, said water pressure normally being sufficient to overcome the sum of the pressures of said closing force and of the hydraulic head in the tank, and a rotary rake structure having rake arms located above and adjacent to said nozzles, and effective to move particles in their path across said nozzles and in said zone of agitation, for delivery to said outlet means, and whereby the oversize fraction at the bottom of the teeter bed is exposed to the agitation by the teeter water from said nozzles, and thus caused to release entrapped undersize particles to overflow, while in transit across said nozzles to said outlet means.

2. The apparatus according to claim 1, wherein said upflow area surrounds a non-agitated central area significantly smaller than said upflow area, and comprising said outlet means adapted to pass said oversize fraction as underflow through said outlet means, in a state of high solids concentration.

3. The apparatus according to claim 2, wherein the tank bottom has a shallow conical configuration, and wherein said induction system comprises an annular main header concentric with said outlet means, and radially extending sub-headers communicating with said main header, inclined substantially to conform to the conicity of said tank bottom, and having inner ends terminating substantially at the periphery of said non-agitated area, each sub-header being provided with valve-type nozzles spaced from one another along said sub-header, and having a resiliently loaded valve closure member.

4. The apparatus according to claim 8, wherein the nozzles of each sub-header are staggered relative to the nozzles of the adjacent sub-headers.

5. The apparatus according to claim 1, wherein said induction means comprise valve type nozzles having a resiliently loaded valve closure member.

6. The apparatus according to claim 1, wherein said induction means comprise nozzles of the check valve type constituting water emission centers adjacent to one another and providing churning effects around said nozzles, and said rake arms are effective to move said particles from one center to the next, so as to be exposed repeatedly to the churning effects of respective emission centers.

7. The apparatus according to claim 1, wherein the tank bottom has a shallow conical configuration, wherein said induction system conforms to said conical configuration, and wherein said induction means comprise valve-type nozzles having a resiliently loaded valve closure member.

8. The apparatus according to claim 1, wherein said induction system comprises an annular main header concentric with said outlet, radially extending sub-headers communicating with said main header, each sub-header being provided with said valve-type nozzles spaced from one another along said sub-header.

9. The apparatus according to claim 1, wherein the tank bottom has a shallow conical configuration, and wherein said induction system comprises an annular main header concentric with said outlet means, and radially extending sub-headers communicating with said main header, inclined substantially to conform to the conicity of said tank bottom, each sub-header being provided with valve-type nozzles spaced from one another along said sub-header, and having a resiliently loaded valve closure member.

10. The apparatus according to claim 7, wherein the nozzles of each sub-header are staggered relative to the nozzles of the adjacent sub-headers.

References Cited
UNITED STATES PATENTS

| | | | |
|---|---|---|---|
| 933,808 | 9/1909 | Willson | 209—454 |
| 1,953,672 | 4/1934 | Damon | 209—161 |
| 2,410,637 | 11/1946 | Darby | 209—454 |
| 2,723,754 | 11/1955 | Darby | 209—461 |
| 2,857,050 | 10/1958 | Nebel | 209—159 |
| 2,960,226 | 11/1960 | Ekstrom | 209—158 |

FRANK W. LUTTER, Primary Examiner

209—159, 500; 210—519, 528; 137—239—453